Patented Sept. 11, 1928.

1,684,327

UNITED STATES PATENT OFFICE.

WALTER MIEG AND ALBERT JOB, OF ELBERFELD, GERMANY, ASSIGNORS TO GRASSELLI DYESTUFF CORPORATION, OF NEW YORK, N. Y., A CORPORATION OF DELAWARE.

VAT DYESTUFF FROM DIANTHRAQUINONYLAMINE-PHENANTHRENEQUINONE.

No Drawing. Application filed June 28, 1926, Serial No. 119,197, and in Germany June 25, 1925.

Our invention consists in vat dyestuffs which are carbazolated dianthraquinonylamino-phenanthrenequinonylenes.

When condensing agents are allowed to act upon dianthraquinonylamines new compounds are obtained which are carbazol-derivatives.

We have now found that when dianthraquinonylamino - phenanthrenequinonylenes are acted upon in a similar way condensation takes place between the anthraquinone nuclei and the phenanthrenyl nucleus with the formation of carbazolated dianthraquinonylamino-phenanthrenequinonylenes.

This condensation is effected by treating the dianthraquinonylamino - phenanthrenequinonylenes with anhydrous aluminum chloride at elevated temperature or by aluminum chloride and a tertiary base as shown by one of us in the co-pending application Serial No. 82,588, filed Jan. 20, 1926 for the carbazolization of dianthraquinonylamines. If the anthraquinonyl nuclei in the dianthraquinonylamino - phenanthrenequinonylenes are substituted by acidyl-amino, for instance benzoylamino groups, the condensation is effected much easier and can be achieved with chlorsulfonic acid or even concentrated sulfuric acid at ordinary or only slightly elevated temperatures.

These various condensing agents will be called for the purpose of this invention carbazol ring forming condensing agents.

The reaction leads through an intermediate product of unknown chemical constitution, but which by oxidation is transformed into the carbazolated dianthraquinonylaminophenanthrenequinonylene. In certain instances this oxidation occurs during the condensation, in others, particularly when working at lower temperatures, mainly the intermediate compound is obtained as the result of the condensation and it is then oxidized afterwards to the carbazole.

The dianthraquinonylamino-phenanthrenequinonylenes useful in our novel process are obtained by treating two molecular proportions of amino-anthraquinones with one molecular proportion of halogen phenanthraquinone in the presence of reagents capable of splitting off hydro-halogen acids. Products of this type are for instance described in the German Patent 222,206.

Dianthraquinonylamino - phenanthrenequinonylenes can be obtained from alpha as well as beta amino-anthraquinones, but the preferred embodiment of our invention consists in using dianthraquinonylamino-phenanthrenequinonylenes obtained from alpha-amino-anthraquinones and 2.7-dihalogen-phenanthrenequinones. Such a compound can be represented by the general formula:

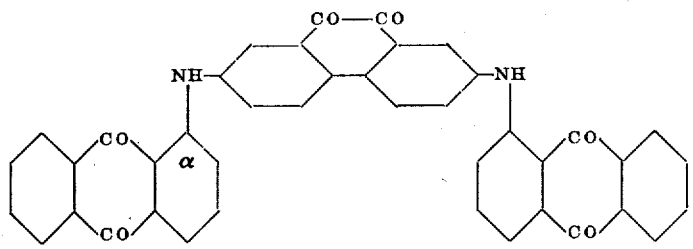

It dyes cotton from a vat copper-red shades.

Substituted dianthraquinonylamino-phenanthrenequinonylenes are obtained similarly from substituted amino-anthraquinones.

The chemical constitution of our novel products is considered to be that of a double carbazole formed by a central phenanthrenquinone nucleus with two anthraquinone nuclei and in the case of using alpha-dianthraquinonylamino - phenanthrenequinonyls can be represented by the most probable chemical formula:

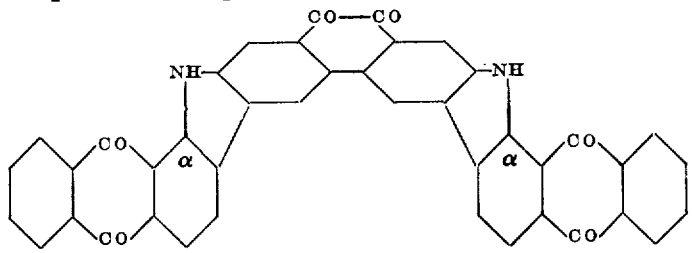

Our novel products are in general dark powders, difficulty soluble even at boiling temperature in most organic solvents, soluble in concentrated sulfuric acid with intense colors, which are changed by the addition of formaldehyde, boric acid or phenolic bodies. They dye cotton from the vat brownish very fast shades.

The following examples will further illustrate our invention, but we wish it understood that we are not limited to the specific materials or reacting conditions mentioned therein. The parts are by weight:

*Example 1.*—1 part of the condensation product obtained from 1 molecular proportion of dibromo-phenanthrenequinone and 2 molecular proportions of alpha-amino-anthraquinone, having most probably the formula:

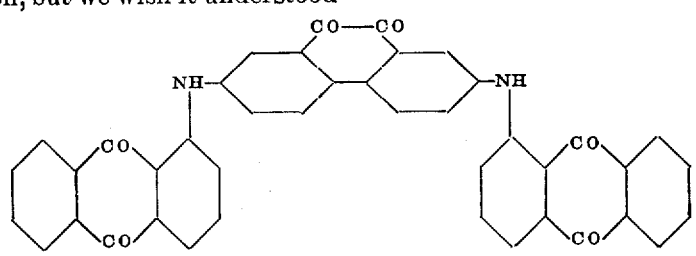

are introduced into a mixture of 3 parts anhydrous aluminum chloride and 6 parts pyridine and heated to 150-180° C. The reaction is completed when a sample of the reaction product isolated from the reaction mixture dissolves in sulfuric acid with a red-brown color. The reaction mass is then poured into diluted hydrochloric acid, filtered off and washed to neutrality. The reddish-brown crude product so obtained is then treated with a sodium hypochlorite solution and isloated in the usual manner. It is a dark reddish-brown powder soluble in concentrated sulfuric acid with a reddish-brown color and dyes cotton from the vat reddish-brown fast shades. It has most probably the formula:

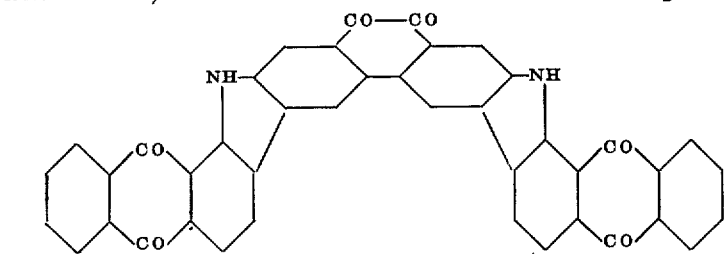

*Example 2.*—1 part of the condensation product obtained from 1 molecular proportion dibromo-phenanthrenequinone and 2 molecular proportions 1-amino-5-benzoylamino-anthraquinone of the probable formula:

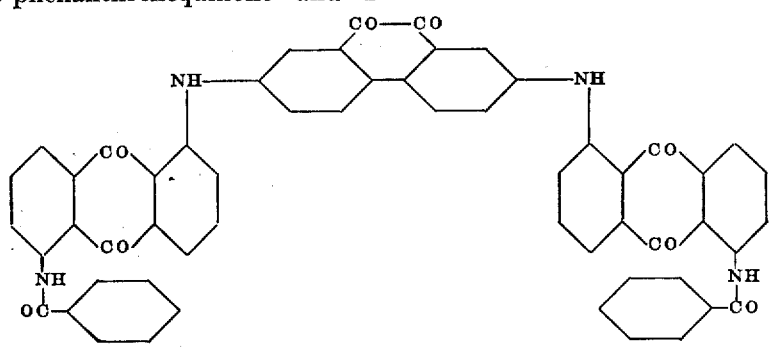

are dissolved in 10-15 parts 96% sulfuric acid at room temperature, and allowed to stand for some time. The color of the solution changes from a violet to a yellowish-brown. Due to the low temperature used during the condensation, no hydrolysis of the benzoylamino groups take place. The reaction mass is now poured into water containing 0.5 parts sodium nitrite, which oxidizes the intermediate compound to the carbazolated derivative, which separates. It is isolated in the usual way by filtering, washing, and drying, and represents a dark powder, difficultly soluble at the boiling point in most organic solvents, soluble in concentrated sulfuric acid with a bluish-violet color which turns blue on the addition of formaldehyde, brown on the addition of phenol or pyrogallol and reddish-violet on the addition of boric acid. It dyes cotton from the vat yellowish-brown shades which are very fast to boiling, chlorine and light. It has most probably the formula:

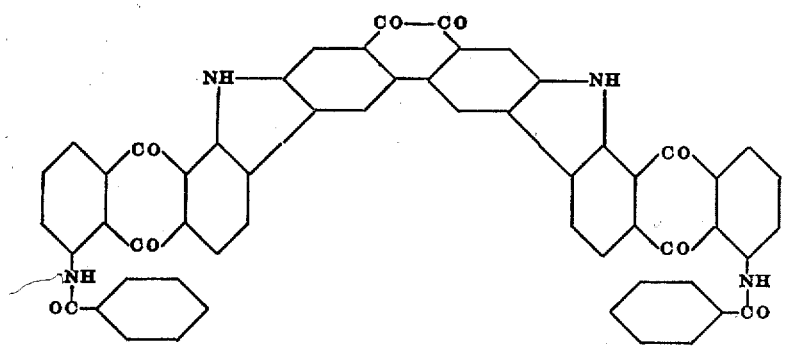

*Example 3.*—1 part of the condensation product from 1 molecular proportion dibromo-phenanthrenquinone and 2 molecular proportions of 1-amino-4-benzoylamino-anthraquinone are dissolved with cooling in 15 parts chlorsulfonic acid. The reaction mass is heated to 40-50° C. and kept at this temperature until the precipitate obtained when a sample poured into water containing sodium nitrite does not any more change its color. The reaction mass is then stirred into 30-40 parts concentrated sulfuric acid and the so obtained solution poured into ice water containing 0.5 parts sodium nitrite. The dyestuff is precipitated and isolated in the usual manner. It is a dark powder and dyes cotton from a raspberry-red vat intense reddish-brown shades. It has most probably the formula:

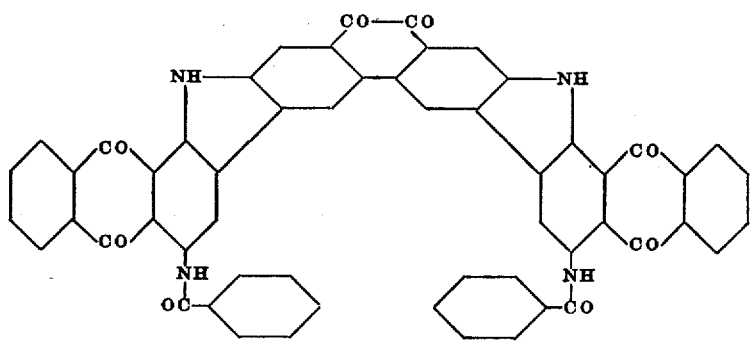

We claim:

1. In processes of making carbazolated dianthraquinonylamino - phenanthrenequinonylenes the step comprising treating dianthraquinonylamino - phenanthrenequinonylenes with carbazol ring forming condensing agents.

2. In processes of making carbazolated dianthraquinonylamino - phenanthrenequinonylenses the step comprising treating alpha-dianthraquinonylamino - phenanthrenequinonylenes with carbazol ring forming condensing agents.

3. In processes of making carbazolated dianthraquinonylamino - phenanthrenequinonylenes the step comprising treating alpha-benzoylamino - alpha - dianthraquinonylamino-phenanthrenequinonylenes with carbazol ring forming condensing agents.

4. In processes of making a brown vat dyestuff the steps comprising treating 5-5'-dibenzoylamino-1-1'-dianthraquinonylamino-phenanthrenequinonylene with concentrated sulfuric acid at room temperature, and oxidizing the intermediate product formed to the dicarbazolated dianthraquinonylamino-phenanthrenequinonylene.

5. As new products carbazolated dianthraquinonylamino - phenanthrenequinonylenes, substantially identical with the condensation products obtained by treating dianthraquinonylamino- phenanthrenequinonylenes with carbazol ring forming condensing agents, which are dark powders, soluble in concentrated sulfuric acid with intense colors and dyeing cotton from the vat brown, fast shades.

6. As new products carbazolated alpha-dianthraquinonylamino - phenanthrenequinonylenes, substantially identical with the condensation products obtained by treating alpha-dianthraquinonylamino-phenanthrenequinonylenes with carbazol ring forming condensing agents, which are dark powders, soluble in concentrated sulfuric acid with intense colors and dyeing cotton from the vat brown, fast shades.

7. As a new product the vat dyestuff which has most probably the formula:

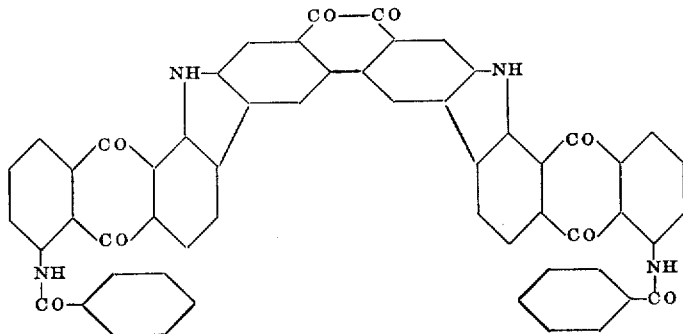

which is a brown powder, soluble in concentrated sulfuric acid with a bluish-violet color, difficultly soluble in the usual organic solvents, dyeing cotton from the vat yellowish-brown, fast shades and which is substantially identical with the product obtained by treating 5-5'-dibenzoylamino - 1 - 1' - dianthraquinonylamino-phenanthrenequinonylene with concentrated sulfuric acid at room temperature and oxidizing the intermediate compound obtained.

In testimony whereof we have hereunto set our hands.

WALTER MIEG.
ALBERT JOB.

---

Certificate of Correction.

Patent No. 1,684,327.   Granted September 11, 1928, to
WALTER MIEG AND ALBERT JOB.

It is hereby certified that error appears in the printed specification of the above numbered patent requiring correction as follows: Page 1, the formula, in the left-hand anthraquinone nucleus, strike out "α"; page 2, the first formula, in the left-hand and in the right-hand anthraquinone nuclei, strike out "α"; and that the said Letters Patent should be read with these corrections therein that the same may conform to the record of the case in the Patent Office.

Signed and sealed this 16th day of October, A. D. 1928.

[SEAL.]
M. J. MOORE,
Acting Commissioner of Patents.

quinonylamino - phenanthrenequinonylenes, substantially identical with the condensation products obtained by treating dianthraquinonylamino- phenanthrenequinonylenes with carbazol ring forming condensing agents, which are dark powders, soluble in concentrated sulfuric acid with intense colors and dyeing cotton from the vat brown, fast shades.

6. As new products carbazolated alpha-dianthraquinonylamino - phenanthrenequinonylenes, substantially identical with the condensation products obtained by treating alpha-dianthraquinonylamino-phenanthrenequinonylenes with carbazol ring forming condensing agents, which are dark powders, soluble in concentrated sulfuric acid with intense colors and dyeing cotton from the vat brown, fast shades.

7. As a new product the vat dyestuff which has most probably the formula:

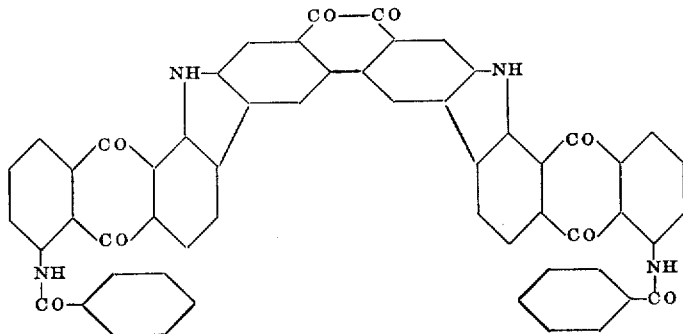

which is a brown powder, soluble in concentrated sulfuric acid with a bluish-violet color, difficultly soluble in the usual organic solvents, dyeing cotton from the vat yellowish-brown, fast shades and which is substantially identical with the product obtained by treating 5-5'-dibenzoylamino - 1 - 1' - dianthraquinonylamino-phenanthrenequinonylene with concentrated sulfuric acid at room temperature and oxidizing the intermediate compound obtained.

In testimony whereof we have hereunto set our hands.

WALTER MIEG.
ALBERT JOB.

---

Certificate of Correction.

Patent No. 1,684,327.  Granted September 11, 1928, to

WALTER MIEG AND ALBERT JOB.

It is hereby certified that error appears in the printed specification of the above numbered patent requiring correction as follows: Page 1, the formula, in the left-hand anthraquinone nucleus, strike out "α"; page 2, the first formula, in the left-hand and in the right-hand anthraquinone nuclei, strike out "α"; and that the said Letters Patent should be read with these corrections therein that the same may conform to the record of the case in the Patent Office.

Signed and sealed this 16th day of October, A. D. 1928.

[SEAL.]
M. J. MOORE,
Acting Commissioner of Patents.